United States Patent
Henrichon, Jr. et al.

(10) Patent No.: US 11,416,725 B1
(45) Date of Patent: Aug. 16, 2022

(54) PLANT AND PLANT BYPRODUCTS TRACEABILITY

(71) Applicants: Ernest G. Henrichon, Jr., Bedford, NH (US); Curtis W. Howes, Georgetown, DE (US)

(72) Inventors: Ernest G. Henrichon, Jr., Bedford, NH (US); Curtis W. Howes, Georgetown, DE (US)

( * ) Notice: Subject to any disclaimer, the term of this patent is extended or adjusted under 35 U.S.C. 154(b) by 0 days.

(21) Appl. No.: 17/078,404

(22) Filed: Oct. 23, 2020

Related U.S. Application Data

(60) Provisional application No. 62/925,352, filed on Oct. 24, 2019.

(51) Int. Cl.
*G06K 19/06* (2006.01)
*G06K 7/14* (2006.01)

(52) U.S. Cl.
CPC ..... *G06K 19/06103* (2013.01); *G06K 7/1417* (2013.01); *G06K 2019/06253* (2013.01)

(58) Field of Classification Search
CPC .............. G06K 19/06103; G06K 7/1417
USPC .......................................................... 235/494
See application file for complete search history.

(56) References Cited

U.S. PATENT DOCUMENTS

| | | | | |
|---|---|---|---|---|
| 6,705,516 B1* | 3/2004 | Kubota | ..................... | G07C 3/00 119/174 |
| 9,552,506 B1* | 1/2017 | Nadabar | ................... | G06K 9/20 |
| 2011/0068177 A1* | 3/2011 | Harris | ....................... | G06K 9/62 235/492 |
| 2012/0199651 A1* | 8/2012 | Glazer | ................... | G06Q 10/08 235/376 |

* cited by examiner

*Primary Examiner* — Ahshik Kim
(74) *Attorney, Agent, or Firm* — Luis Figarella

(57) ABSTRACT

A system and method for maintaining identification and traceability about the provenance of finished products that come from selected individual plants through said plant's life cycle, by using the individualized identification data over a period of time, events and processes in order to maintain correlation of individual plants to specific by-products in regard to traits or characteristics of those selected plants.

8 Claims, 4 Drawing Sheets

PLANT AND PLANT BYPRODUCTS TRACEABILITY

CROSS-REFERENCE TO RELATED APPLICATIONS

This application claims priority to U.S. Provisional patent application Ser. No. 62/925,352 titled "Plant and Plant Byproducts Traceability", filed on Oct. 24, 2019 the disclosure of which is herein incorporated by reference in its entirety.

PATENTS CITED

The following documents and references are incorporated by reference in their entirety, Hyde et al (U.S. Pat. Pub. No. 2009/0231099), Fuessley et al (U.S. Pat. No. 7,702,462), Dagdelen et al (U.S. Pat. No. 9,959,438), Costa et al (U.S. Pat. Nos. 7,852,195; 8,063,736; 8,872,622 and 9,652,775) and Emond et al (U.S. Pat. No. 9,449,266).

FIELD OF THE INVENTION

The present invention relates to maintaining identification and traceability about the provenance of finished products that come from selected individual plants through said plant's life cycle, and using that individualized identification data over a period of time, events and processes in order to maintain correlation of individual plants to specific byproducts in regard to traits or characteristics of those selected plants.

DESCRIPTION OF THE RELATED ART

In certain agricultural industries, there is a need to maintain traceability to specific plant sources for a particular product. While others have worried about location (such as terroir is to grapes), certain plants whose harvesting results in the production of oils and other byproducts have specific requirements.

Systems, such as the METRC system assigns a Unique ID (UID) tag to a lot of cuttings from a mother plant (up to 100 cuttings, but all having the same lot UID). The lot UID associates the cuttings with the properties of the mother plant (strain, cutting date, history, etc.).

When the cuttings start to bloom, they each receive their own plant UID (RFID) that references back to the lot UID. When the lot is harvested, UID package tags (both Barcode and/or RFID) are placed on each of the resulting items (harvest batches, testing lab samples, production batches, splitting of packages, etc.). If an item is split into other items, the new items receive different package tags.

An authorized auditor can scan an end product and trace it all the way back to the mother plant. The METRC system is only for regulatory personnel to use (a licensee can only see data that he created). End users and sales clerks, distributors, etc. do not have access to the chain of custody data.

Thus today, when a plant is processed and said processing results in oils and other products (including human consumables), there is a need to preserve the plant's provenance along the mfg. processes. What is needed is an easy to implement system and method through which a plant's byproduct can be traced back to the original plant (or plants) from which it came, preferably traced by mfrs., vendors and users.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about a system for tracing plant byproducts, said system comprising one or more Auto ID components configured for attachment to one or more plants or process from which a plant by-product is obtained, one or more brand source authenticator components configured for incorporation into one or more finished packaged plant by-products and one or more servers connected to one or more Auto ID data collection components, said servers configured to collect the AutoID information from one or more of said plant by-products or finished packaged plant by-products and store the history of said AutoID collections. In another aspect, said AutoID components are comprised of one or more of the following: 1-D barcodes, 2-D barcodes, RFID tags, NFC unique ID or other similar Unique ID tags. In yet another aspect, said brand source authenticator components comprise; a carrier with at least a first human observable surface, one or more authenticator indicia carried by said first human observable surface and said authenticator indicia indicating the source of said Brand source authenticator.

In another aspect, one or more authentication indicia AutoID component includes at least a 2-D encoded symbology which when decoded, indicates the Brand "source" of the article to which said carrier is to be attached. In yet another aspect, said authentication indicia further includes an identifier unique to each individual article to which said carrier is to be attached. In another aspect, said authentication indicia is applied to said carrier by the use of a laser. In yet another aspect, said authentication indicia is direct part marked.

In one aspect, the invention is about a method for tracing plant byproducts, said method comprising applying one or more Auto ID components configured for attachment to one or more plants or process from which a plant by-product is obtained, applying one or more brand source authenticator components configured for incorporation into one or more finished packaged plant by-products and supplying one or more servers connected to one or more Auto ID data collection components, said servers configured to collect the AutoID information from one or more of said plant byproducts or finished packaged plant by-products and store the history of said AutoID collections. In another aspect, said AutoID components are comprised of one or more of the following: 1-D barcodes, 2-D barcodes, RFID tags, NFC unique ID or other similar Unique ID tags. In yet another aspect, said brand source authenticator components comprise; a carrier with at least a first human observable surface, one or more authenticator indicia carried by said first human observable surface and said authenticator indicia indicating the source of said Brand source authenticator.

In another aspect, one or more authentication indicia AutoID component includes at least a 2-D encoded symbology which when decoded, indicates the Brand "source" of the article to which said carrier is to be attached. In yet another aspect, said authentication indicia further includes an identifier unique to each individual article to which said carrier is to be attached. In another aspect, said authentication indicia is applied to said carrier by the use of a laser. In yet another aspect, said authentication indicia is direct part marked.

In one aspect, the invention is about a computer-implemented method for tracing plant byproducts, said method comprising applying one or more Auto ID components configured for attachment to one or more plants or process from which a plant by-product is obtained, applying one or more brand source authenticator components configured for incorporation into one or more finished packaged plant by-products and supplying one or more servers connected to one or more Auto ID data collection components, said servers configured to collect the AutoID information from one or more of said plant by-products or finished packaged plant by-products and store the history of said AutoID collections. In another aspect, said AutoID components are comprised of one or more of the following: 1-D barcodes, 2-D barcodes, RFID tags, NFC unique ID or other similar Unique ID tags. In yet another aspect, said brand source authenticator components comprise; a carrier with at least a first human observable surface, one or more authenticator indicia carried by said first human observable surface and said authenticator indicia indicating the source of said Brand source authenticator.

In another aspect, one or more authentication indicia AutoID component includes at least a 2-D encoded symbology which when decoded, indicates the Brand "source" of the article to which said carrier is to be attached. In yet another aspect, said authentication indicia further includes an identifier unique to each individual article to which said carrier is to be attached. In another aspect, said authentication indicia is applied to said carrier by the use of a laser. In yet another aspect, said authentication indicia is direct part marked.

Other features and advantages of the present invention will become apparent upon examining the following detailed description of an embodiment thereof, taken in conjunction with the attached drawings.

Figure 1:
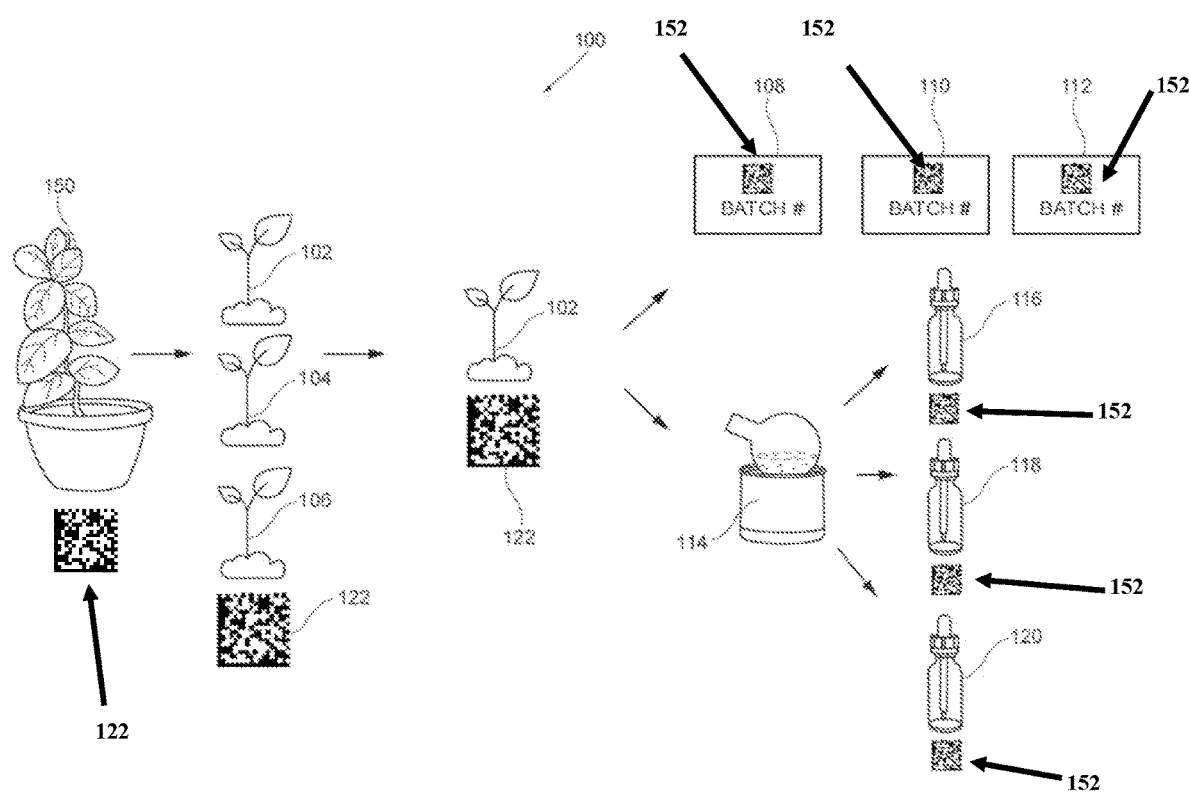
FIG. 1 shows an illustration of the system throughout the life cycle of a plant, according to an exemplary embodiment of the invention.

The above-described and other features will be appreciated and understood by those skilled in the art from the following detailed description, drawings, and appended claims.

DETAILED DESCRIPTION OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1 we see 100 an exemplary embodiment of the invention. One or more plants 102/104/106 are obtained, either from seeds or as cutoffs from a mother plant

150. Each said mother plant 150 is equipped with one or more AutoID components 122 (be it a 1-D barcode, a 2-D barcode, Radio Frequency Identification (RFID) or other similar uniquely identified automated data collection device) which will permit the user to know from which device came the by-product of the next production step.

Thus, for example, a bush or plant 102 obtained from the mother plant 150 will be processed in order to obtain one or more products, through one or more processes. The actual plant may have edible, smokable or other direct-action by-products 108/110/112 or 116/118/120, in which case the individual batch information for the process is electronically stored within a database. In this fashion, we do not only trace the plant conversion through steps, but we also preserve the provenance. This may be the plant 102/104/106, mother plant 150, batch 108/110/112 and/or oil extraction 114 into batches 116/118/120).

In one embodiment, the above is accomplished via the attachment of individual unique ID AutoID components 122 to each individual plant 102/104/106 or seedling. In this fashion, the connectivity along the production chain of each said product is then individually recorded at the creation, packaging and forwarding throughout the distribution chain.

Figure 2:
FIG. 2 shows an example of a labeled product in an overpack, according to an illustrative embodiment of the invention.
Figure 3:
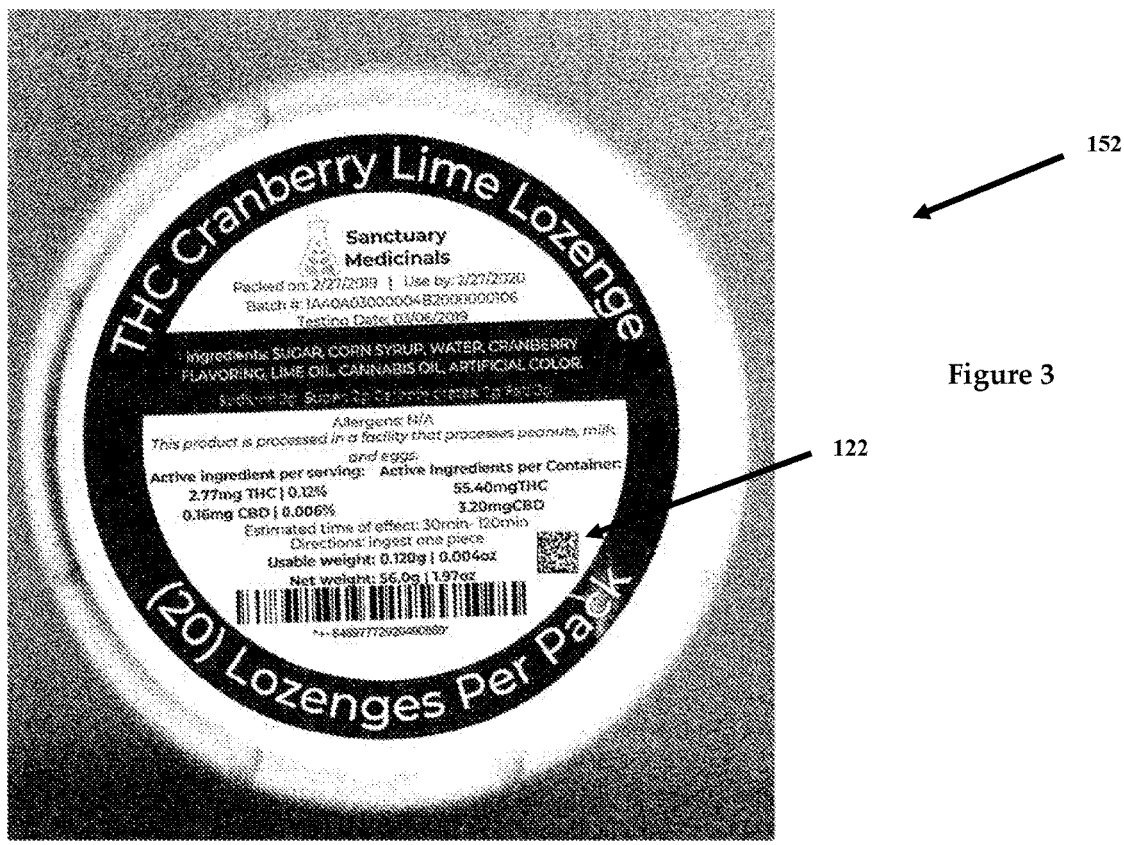
FIGS. 3-4 show examples of a label placed on the product containing multiple fruit chews, according to illustrative embodiments of the invention.
Figure 4:
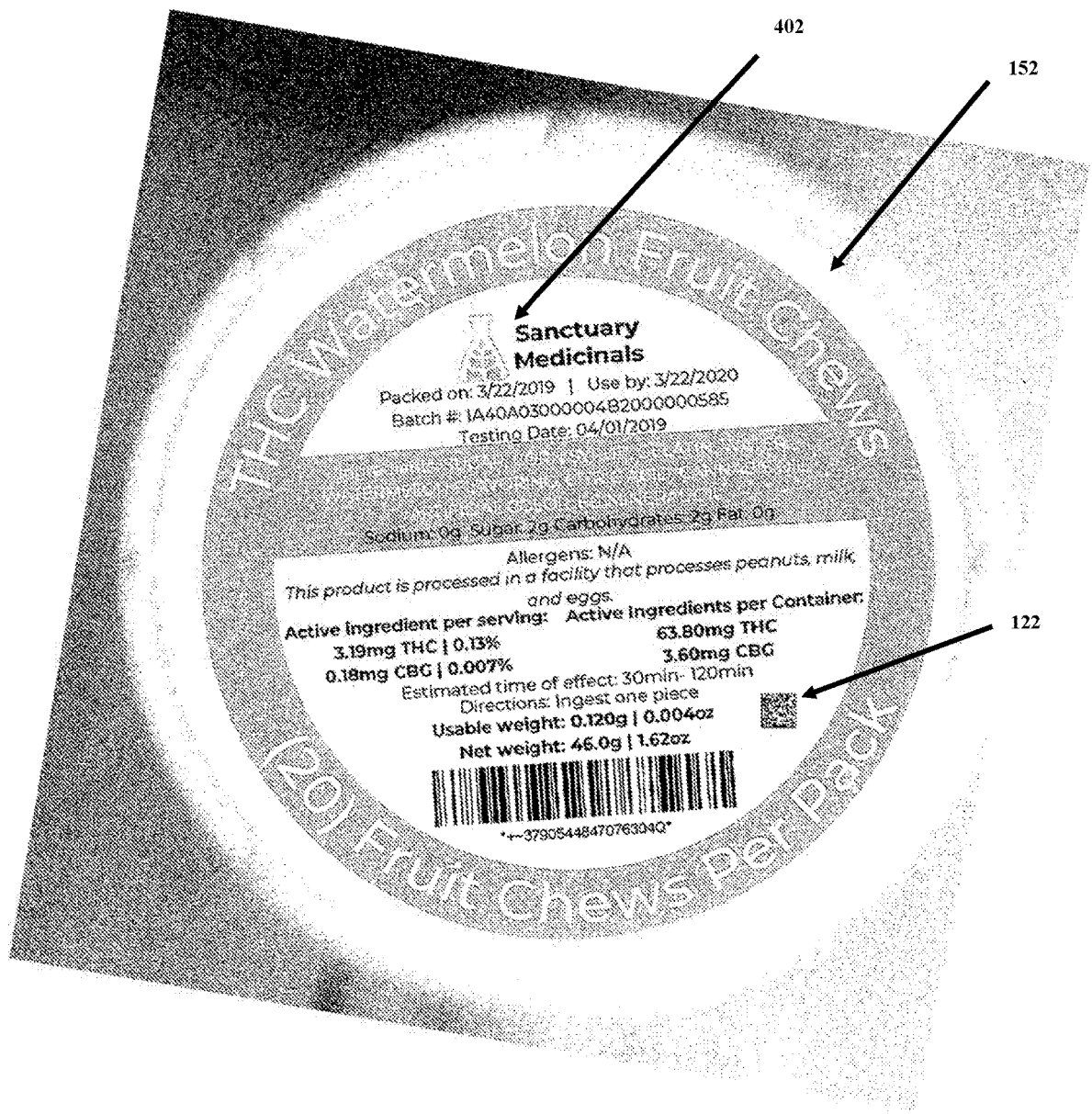

One or more servers are then connected to the production machinery to ensure that the AutoID attached to the packaging 200, 300, 400 (FIGS. 2-4) at one or more locations (including invisible locations, such as the RFID being inside the product packaging) is recorded to a database, establishing a blockchain of provenance that allows you to track the one or more plant and/or plant byproducts used in any of the processes, updating where they came from, and what makes by-products where said by-product results from two or more of them being joined.

Figure 5:
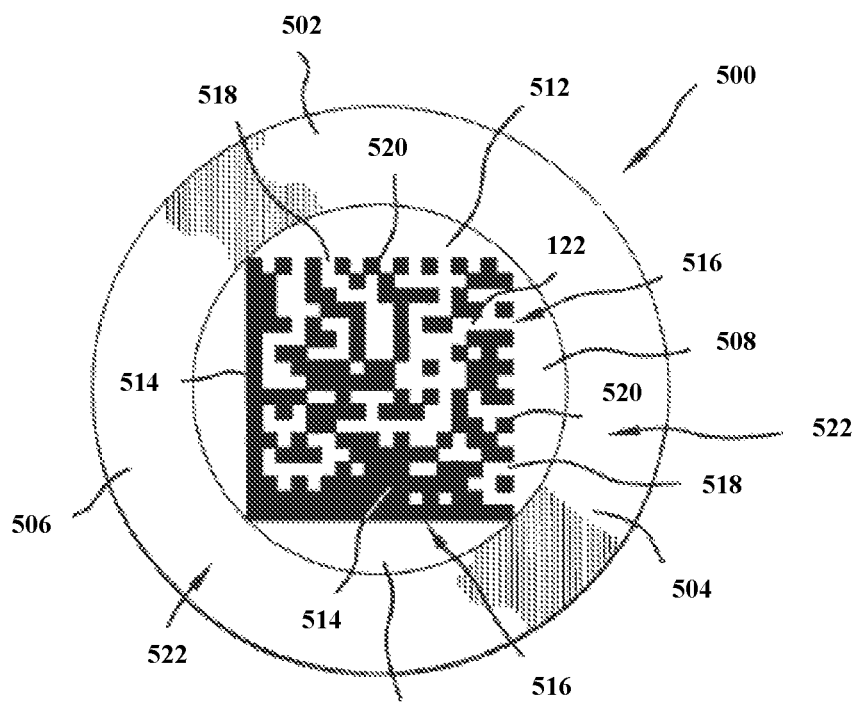
FIG. 5 shows an example of a Brand "source" authenticator carrier or authenticator indicia, according to an illustrative embodiment of the invention.

When the by-product is incorporated into a finished products 108/110/112/116/118/120, in one embodiment, the AutoID component 122 may be augmented to become a Brand "source" authenticator carrier or authenticator indicia 152 (FIG. 5) incorporating at least one first human observable surface 502 to which an authenticator indicia AutoID component 122 as well one or more additional visual brand identifiers 502/504/506.

This is accomplished, by the addition of one or more Trademark 402 of unique images on said brand fields 502, 504, 506 that are also incorporated onto the authenticator surface 502 of the authenticator 152 in addition to one or more data fields 508. At least one of said Brand fields 502, 504, 506 is there to carry and display the Brand of the authentication system provider (the entity that can demonstrate the provenance of the material from the original plant through its processing), i.e. the Brand "source" of the authenticator itself.

While all or some of the Brand fields 502, 504, 506 may also carry and display the Brand of the authentication system provider one or more of said Brand fields 502, 504, 506 may be allocated to carry and display the Brand to be authenticated or another Brand of the Brand "source" to be authenticated. Such Brands of the authentication system provider and the Brand "source" to be authenticated which are carried and displayed in fields 502, 504, 506 are so carried and displayed unencoded and user recognized; while authentication data 510, carried by and displayed in authentication field 508, is allocated preferably to encoded symbology 122.

In one embodiment, the encoded symbology 122 is shown as a 2-D, Data Matrix type, symbology In the matrix code format, black data elements (cells) usually represent a binary "1" and white data elements (cells) usually represent a binary "0"; but the opposite is also possible. When these binary values are used together in specific sequences, they represent alphanumeric characters. The basic elements of encoded matrix symbol 122, although shown, for example, as a square, may also be rectangular, circular or of other configurations, and usually include a data storage field 512 disposed between either a solid border 514 or a broken border 516, or a combination of same, to facilitate location and decoding of the encoded data.

White data cells 518 and black data cells 520 are arranged within data storage field 512, through known conventional methods, to provide encoded data, information and the like. Data Matrix symbol 122 is of the type which has been placed in the public domain and has been recommended by the American National Standards Institute (ANSI) for use in direct part marking. Generally encoded symbols, such as symbol 122, are applied to a carrier strip such as a pressure sensitive label which could then be applied to authenticator 152. Note any suitable 2-D barcode may be used, including QR-code, Aztec code and others.

Example 1

In one example, we can trace a tree 150 from which one or more inserts, branches, seeds or saplings 102/104/106 are obtained. At the time when each said sapling is obtained, a provenance path is established in one or more computer servers, on which the information about the mother tree 150 is linked to that of the saplings 102/104/106. This information includes the AutoID (be it one or more or a combination of RFID tags, 1-D barcodes, 2-D barcodes, NFC unique ID media or any other automated data collection component), as well as any other time/condition/location information.

As the saplings 102/104/106 develop (be it on earth, hydroponically, or any other way), data may be collected from each one at certain intervals, and added to the development/provenance database for each sapling. At the time of harvest, the plants may be combined (so that the provenance record of any particular batch 108/110/112 or the oil extraction process 114 resulting in other batches 116/118/120), would then include the two or more provenance records from the plants 102/104/106 from which was derived.

In the above fashion, the system will record (error free through the AutoID tags 122) that batch 116 is derived through the use of an oil extractor 114 which received portions from plant 102 that resulted in said 116 batch. By including this final 116 as the AutoID in the packaged product 300, any user would be able to scan the code 122 with their cellphone, be connected to a server and automatically obtain the record for the provenance of their product.

The above example points out the many advantages of a thorough provenance track. Of course, there is the possibility that someone would simply copy the cover of any product and proceed to replicate the same batch. In an expansion of the provenance effect, one or more specific and intended 'defects' could be done on purpose to the 2-D barcode 122 on the product. In another embodiment, a Near Field Communication (NFC) inlay may be placed under the label, said NFC containing a Unique Identification (UID) that is not easily duplicated. For example, if the UID is written by the chip mfr. and cannot be overwritten. Such a UID may be read by an app in a Smartphone or computer terminal.

The provenance chain would know which were the intended defects (i.e. in which specific codeword of the symbol there IS going to be an error), and the decoder would then be enhanced to report specific error by codeword. If 2-D barcode 122 is simply a copy, we would know the code was simply copied via a number of methods (including knowing the provenance of scans for such a UID). If someone generated their own code (without knowing the algorithm for inducing errors), the decoder would know that you have an invalid code.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A system for tracing plant byproducts, said system comprising:
   one or more Auto ID components configured for attachment to one or more plants or process from which a plant by-product is obtained, wherein said Auto ID components are comprised of one or more of the following:
   1-D barcodes or 2-D barcodes;
   one or more brand source authenticator components configured for incorporation into one or more finished packaged plant by-products, and said brand source authenticator components comprise: a carrier with at least a first human observable surface, one or more authenticator indicia carried by said first human observable surface and said authenticator indicia indicating the source of said brand source authenticator;
   one or more authentication indicia Auto ID component includes at least a 2-D encoded symbology which when decoded, indicates the brand source of the article to which said carrier is to be attached;
   said authentication indicia further includes an identifier unique to each individual article to which said carrier is to be attached; and
   one or more servers connected to one or more Auto ID data collection components, said servers configured to collect the Auto ID information from one or more of said plant by-products or finished packaged plant by-products and store the history of said Auto ID collections.

2. The system of claim 1 wherein:
   said authentication indicia is applied to said carrier by the use of a laser.

3. The system of claim 1 wherein:
   said authentication indicia is direct part marked.

4. A method for tracing plant byproducts, said method comprising:
   applying one or more Auto ID components configured for attachment to one or more plants or process from which a plant by-product is obtained, wherein said Auto ID components are comprised of one or more of the following:
   1-D barcodes or 2-D barcodes;
   applying one or more brand source authenticator components configured for incorporation into one or more finished packaged plant by-products, and said brand source authenticator components comprise: a carrier with at least a first human observable surface, one or more authenticator indicia carried by said first human observable surface and said authenticator indicia indicating the source of said brand source authenticator;
   one or more authentication indicia Auto ID component includes at least a 2-D encoded symbology which when decoded, indicates the brand source of the article to which said carrier is to be attached;
   said authentication indicia further includes an identifier unique to each individual article to which said carrier is to be attached; and
   supplying one or more servers connected to one or more Auto ID data collection components, said servers configured to collect the Auto ID information from one or more of said plant by-products or finished packaged plant by-products and store the history of said Auto ID collections.

5. The method of claim 4 wherein:
   said authentication indicia is applied to said carrier by the use of a laser.

6. The method of claim 4 wherein:
   said authentication indicia is direct part marked.

7. A computer-implemented method for tracing plant byproducts, said method comprising:
   applying one or more Auto ID components configured for attachment to one or more plants or process from which a plant by-product is obtained, wherein said Auto ID components are comprised of one or more of the following:
   1-D barcodes or 2-D barcodes;
   applying one or more brand source authenticator components configured for incorporation into one or more finished packaged plant by-products, and said brand source authenticator components comprise: a carrier with at least a first human observable surface, one or more authenticator indicia carried by said first human observable surface and said authenticator indicia indicating the source of said brand source authenticator;
   one or more authentication indicia Auto ID component includes at least a 2-D encoded symbology which when decoded, indicates the brand source of the article to which said carrier is to be attached;
   said authentication indicia further includes an identifier unique to each individual article to which said carrier is to be attached; and supplying one or more servers connected to one or more Auto ID data collection components, said servers configured to collect the Auto ID information from one or more of said plant by-products or finished packaged plant by-products and store the history of said Auto ID collections.

8. The method of claim 7 wherein:

said authentication indicia is applied to said carrier by the use of a laser.

* * * * *